United States Patent [19]

Battisti et al.

[11] 4,096,139
[45] Jun. 20, 1978

[54] AZOCOUMARINIC-TYPE DYES FOR THE DISPERSE DYEING OF TEXTILE FABRICS

[75] Inventors: Ruggero Battisti, Novara; Camillo Paffoni, Pogno (Novara), both of Italy

[73] Assignee: Montedison S.p.A., Milan, Italy

[21] Appl. No.: 709,089

[22] Filed: Jul. 27, 1976

[30] Foreign Application Priority Data

Jul. 31, 1975 Italy .................................. 25962/75

[51] Int. Cl.² ...................... C09B 43/00; C09B 43/12; D06P 1/18; D06P 3/85
[52] U.S. Cl. .................................. 260/152; 260/205; 260/206; 260/207; 260/207.1; 260/208; 260/465.4
[58] Field of Search .............. 260/152, 343.2 R, 340.2

[56] References Cited

U.S. PATENT DOCUMENTS

| | | | |
|---|---|---|---|
| 2,074,186 | 3/1937 | Markush | 260/152 |
| 2,227,977 | 1/1941 | McNally et al. | 260/152 |
| 3,127,390 | 3/1964 | Mueller et al. | 260/152 |
| 3,344,132 | 9/1967 | Bien et al. | 260/152 |
| 3,468,872 | 9/1969 | Schefczik et al. | 260/152 |
| 3,514,471 | 5/1970 | Yanagisawa et al. | 260/343.2 R |
| 3,872,106 | 3/1975 | Koch | 260/343.2 R |

FOREIGN PATENT DOCUMENTS

| | | | |
|---|---|---|---|
| 916,968 | 1/1954 | Germany | 260/152 |
| 1,227,586 | 10/1966 | Germany | 260/152 |
| 47-7714 | 3/1972 | Japan | 260/152 |
| 928,767 | 6/1963 | United Kingdom | 260/152 |

OTHER PUBLICATIONS

Harris, Chemical Abstracts, vol. 72, No. 56674b (1970).
Bien et al. (III), Chemical Abstracts, vol. 66, No. 19818g (1967).
Bien et al. (IV), Chemical Abstracts, vol. 63, No. 5790d (1965).

Primary Examiner—Floyd D. Higel
Attorney, Agent, or Firm—Morgan, Finnegan, Pine, Foley & Lee

[57] ABSTRACT

There is provided a new azoic dye having the general formula

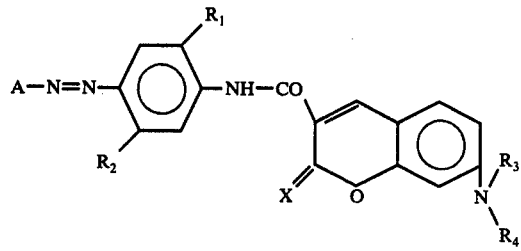

wherein: A is an aromatic radical of the benzene class which has been substituted with at least one group selected from among alkyl, alkoxyl, N-dialkylamine, halogen, cyano and nitro;

X is selected from the group consisting of NH and O;
$R_1$ is selected from the group consisting of H, $CH_3$, $OCH_3$ and Cl;
$R_2$ is selected from the group consisting of H, $CH_3$, $OCH_3$, Cl;
$R_3$ is selected from the group consisting of $CH_3$ and $C_2H_5$; and
$R_4$ is the same as $R_3$, such dye being useful in the printing and dyeing of the textiles, particularly hydrophobic synthetic fibers such as polyester fibers.

13 Claims, No Drawings

AZOCOUMARINIC-TYPE DYES FOR THE DISPERSE DYEING OF TEXTILE FABRICS

BACKGROUND OF THE INVENTION

Prior to the present invention, there were known azoic dyes containing the coumarinic ring. Such dyes do not exhibit outstanding dyeing characteristics. The present invention is concerned with dyes of azoic-type but with a structure substantially different from the known azoic dyes and which have superior characteristics thereover as dyeing agents.

OBJECTS OF THE INVENTION

An object of this invention is that of providing a new class of dyes that will display excellent overall stability characteristics.

Another object is that of further providing a new class of intermediate compounds for obtaining such dyes which intermediates can be referred to as paraphenylazo-cyanaceticanilide or 4-cyanaceticamido-azophenyl compounds, hereinafter "cyanacetic-anilide" for brevity's sake.

These and still other objects, which will appear even more clearly to the skilled in the art, are achieved according to this invention.

SUMMARY OF THE INVENTION

The present invention comprises a new class of azoic dyes falling under the formula:

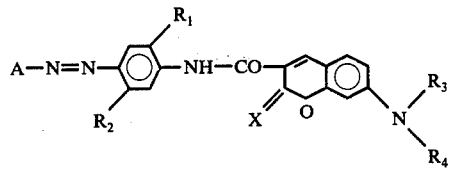

wherein:
A is selected from the group consisting of a residue of a diazotizable base also substituted with alkyls, alkoxyls, halogens, sulphomethyl groups, sulphamide groups, cyano-groups, nitro-groups, acetamide groups and a residue of a coupling base substituted with N-dialkylamine groups and also with a group selected from the group consisting of alkyl, alkoxyl and acetamide groups.

X is selected from the group consisting of NH and O;

$R_1$ is selected from the group consisting of H, $CH_3$, $OCH_3$ and Cl;

$R_2$ is selected from the group consisting of H, $CH_3$, $OCH_3$, Cl;

$R_3$ is selected from the group consisting of $CH_3$ and $C_2H_5$;

$R_4$ is the same as $R_3$.

The new azoic dyes, corresponding to formula (I), allow one to obtain dyeings and printings of a shade ranging from yellow to orange, on hydrophobic synthetic fibres, more particularly on polyester fibres, with a high dyeing strength and good overall characteristics, in particular fastness to light, fastness to wet and thermal treatments.

The present invention also provides a new class of intermediate compounds for obtaining the novel dyes mentioned above, such intermediate compounds being referred to as paraphenylazocyanaceticanilide or 4-cyanaceticamidoazophenyl compounds of "cyanaceticanilide" for brevity's sake.

GENERAL DESCRIPTION OF THE INVENTION

As indicated earlier, the present invention concerns a new class of azoic dyes having the general formula:

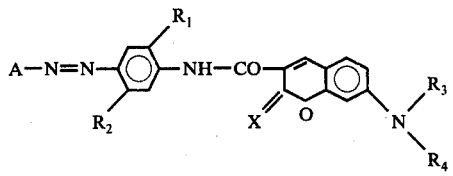

wherein:
A is selected from the group consisting of a residue of a diazotizable base also substituted with alkyl, alkoxyls, halogens, sulphomethyl groups, sulphamidic groups, cyano-groups, nitro-groups, acetamide groups and a residue of a coupling base substituted with N-dialkylamine groups and also with a group selected from the group consisting of alkyl, alkoxyl and acetamide groups.

X is selected from the group consisting of NH and O;

$R_1$ is selected from the group consisting of H, $CH_3$, $OCH_3$ and Cl;

$R_2$ is selected from the group consisting of H, $CH_3$, $OCH_3$ and Cl;

$R_3$ is selected from the group consisting of $CH_3$ and $C_2H_5$;

$R_4$ is the same as $R_3$.

These dyes are suitable for applications of the "thermosol" type (190° – 220° C).

The dyes of this invention have, moreover, shown an excellent behavior in the dyeing and printing of mixed polyestercotton fibres, according to known processes in use at present.

For this latter application, the dyes must satisfy particular requisites such as:
a satisfactory affinity for polyester fibres;
an affinity for cotton in the presence of swelling agents;
possibility of obtaining dyes with very limited differences in shades on the two fibres.

The dyes of formula (I) are obtained by reacting products of structure (II) cyanaceticanilide with a p-N-dialkylaminosalicylaldehyde (III) according to the scheme:

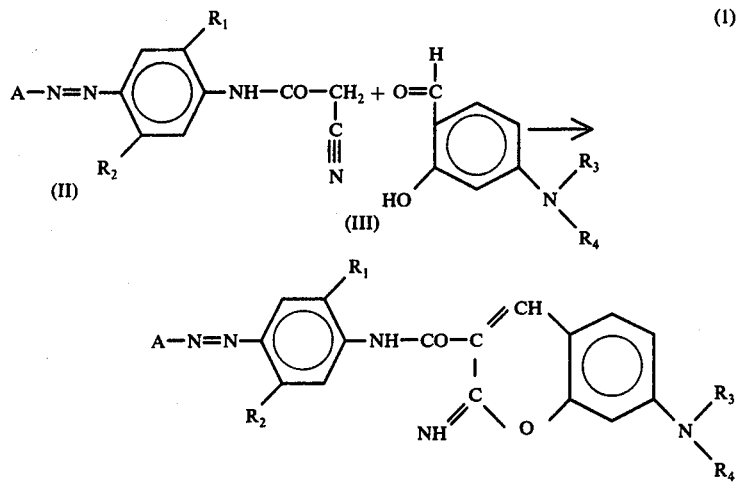

wherein: A, $R_1$, $R_2$, $R_3$, $R_4$ have the meaning already indicated.

In practice, the intermediate (II) cyanaceticanilide is dissolved in an organic solvent, preferably dimethylformamide and/or ethanol. This solution is then treated with p-N-dialkylaminosalicyl aldehyde in the presence of a basic catalyst and is then reflux-heated for about 1 hour. There is formed a precipitate which is filtered, washed and dried. Thereby is obtained a compound within the above formula I wherein X = NH.

By treating compound with X = NH with diluted HCl there is obtained compound wherein X = O.

As the basic catalyst, piperidine is preferably used.

Intermediate (II) which participates in the reaction (1) is obtained by condensation according to known methods between the aminoazo compound (IV) and the compound (V) (acid or cyanacetic ester), according to the reaction:

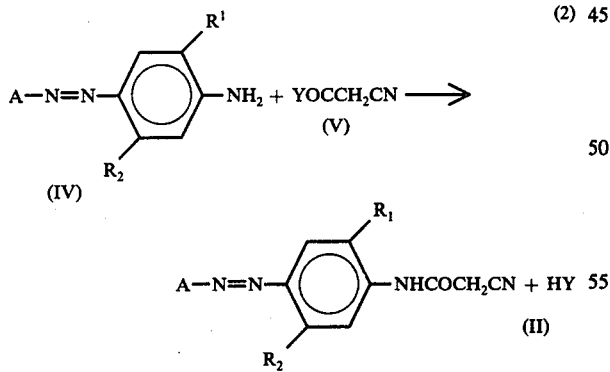

wherein:

A, $R_1$, $R_2$ have the meaning already indicated;
Y = OH, OR (with R = low alkyl).

The amino-azo compound (IV) can, in its turn, be obtained by conventional methods:

(a) by diazotizing an A base (e.g.: aniline, toluidine, anisidine, xylidine, chloro-aniline, 2-nitro-4-methoxyaniline) and by coupling it with the amine of formula:

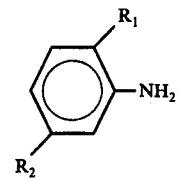

(b) by diazotizing and coupling 4-nitro-aniline of formula:

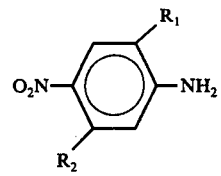

with a coupling base A (e.g.: N-dimethyl-aniline, N-dimethyl-chloroaniline, N-dimethyl-m-toluidine) and by the subsequent reduction of the nitro-group.

Reaction (2) of the amino-azo compound (IV) with compound (V) is conducted according to conventional procedures, e.g., by direct condensation of compound IV with cyanacetic ester or by condensation of compound IV with cyanacetic acid, in this latter case also in the presence of $PCl_5$.

SPECIFIC DESCRIPTION OF THE INVENTION

The following examples illustrate the inventive idea without, however, limiting its scope.

EXAMPLE 1

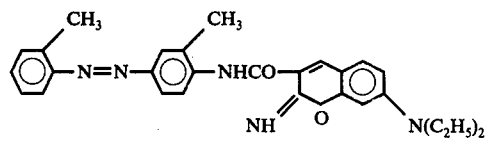

22.5 g of aminoazotoluene were dissolved in 100 ml of dimethylformamide, and to this solution were added 71.5 g of ethyl cyanacetate. This mixture was then reflux-heated for 3 hours.

After cooling down and acidification with HCl, the mixture was diluted with water and the precipitated cyanaceticanilide [intermediate (II)] was filtered. The unreacted amine remained in solution as hydrochloride. The precipitate was then washed with water until attaining neutrality and, after drying, 17.52 g of cyanaceticanilide were obtained. This same cyanaceticanilide was also obtained with lower outputs by adding, in small portions, 48 g of $PCl_5$ to a suspension of 45 g of amino-azotoluene and 21 g of cyanacetic acid in 400 ml of toluene, under stirring and at room temperature.

After heating for 3 hours at 100° C the suspension was cooled down and the suspended solid was filtered.

This latter was then treated with dimethylformamide, acidified with HCl and then poured into water. After filtering, washing and drying, there were obtained 10 g of the cyanaceticanilide corresponding to general formula (II).

29.2 g of such cyanaceticanilide were then dissolved in 200 ml of dimethylformamide and 400 ml of ethanol. To this solution were added 21.23 g of N-diethyl-salicyl aldehyde and 1.38 g of piperidine and the whole was then reflux-heated for one hour. Thereby formed a precipitate which was filtered and washed with ethanol first and then with water. After drying there were obtained 40.5 g of the yellow azoic iminocoumarin dye that showed the following percentage analysis:

Found percentage : C = 71.99–72.22; H = 6.22–6.26; N . = 15.12–15.18; Theoretical percentage for $C_{28}H_{29}N_5O_2$: C = 71.9; H = 6.2; N = 15.

The product showed a maximum absorption in the visible spectrum at λ 460 mμ(acetone) and in the IR spectrum (nujol) clearly revealed the presence of an intense band in the 6μ zone, attributable to the C=O group, and an absorption typical of iminic NH in the 3μ zone.

EXAMPLE 2 (dyeing):

In an apparatus for pressurized dyeing, 100 g of a preventively scoured polyester fabric were treated for 10–15 minutes in a 2-liter dyeing bath at 50° C containing:

2 g/lt of ammonium sulphate, 1 g/lt of ELU emulsion (non-ionogenic surfactant, produced by Montedison).

To this dyeing bath was then added 1 g of the dye prepared according to Example 1, previously dispersed and filtered through a sieve. The bath was then brought to a pH = 5.5 with formic acid, heated over between 20–30 minutes up to 90° C, thereafter slowly raising the temperature to attain 130° C at which level it was maintained for 60 minutes.

At the end of the dyeing, the bath was cooled down to 80°–85° C, then it was discharged, the fabric was rinsed and then submitted to a reducing alkaline treatment for 20 minutes at 80° C with a bath containing:

2 ml/lt of caustic soda at 36 Bé

2 g/lt of Albite A ($Na_2S_2O_4$ at 85%)

0.5 g/lt of Diapal CW (non-ionogenic detersive, produced by Montedison).

The fabric was then abundantly rinsed and dried. The dyeing thus obtained, of a bright yellow tone, displayed a high intensity, good light and moisture fastnesses, and an excellent stability under thermal treatments.

EXAMPLE 3 (dyeing)

The polyester-cotton fabric, suitably scoured, was printed with a paste of the following formulation:

| | |
|---|---|
| dye (Example 1) | 8 g |
| alginate thickener | 50 g |
| diethylenglycol diacetate | 8 g |
| water | 34 g |

The dried fabric, by retaining some solvent useful for the fixing of the dye, was thermo-fixed in hot air at 200° C for 1 – 2 minutes. Then, it was first washed in running water, then subjected to hot soaping and finally rinsed in running water, thereby obtaining a printing of a yellow tinge, free of contrast, with high characteristics of light fastness, resistance to moisture, to rubbing and stable to thermal treatments.

EXAMPLE 4

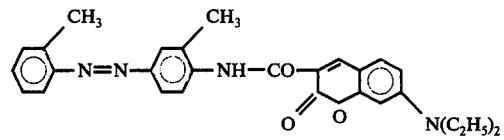

23.35g of the azo-iminocoumarin dye, obtained according to Example 1, were reflux-treated for about 15 hours with 1000 ml of 5% HCl and a few drops of sodium sulphoricinate.

The solid was filtered, washed in water and, after drying, there were obtained 21.8 g of a yellow azocoumarinic dye showing the following percentage analysis:

Found percentage: C 72.12–72-21, H = 6.20–6.15, N = 12.06–11.97; Theoretical percentage for $C_{28}H_{28}N_4O_3$: C = 71.8%, H = 6%; N = 11.9%.

The product showed a maximum absorption in the visible spectrum at λ 440 mμ (acetone) and clearly showed in the IR spectrum (nujol) the presence of an intense band in the 6.1μ zone typical of the C=O group.

Moreover, there was observed the disappearance of the absorption of the iminic NH group in the 3μ-zone.

By applying this dye onto polyester, according to Example 2, there was obtained a dyeing of a bright yellow tinge, with high intensity, a good light fastness, resistance to moisture and an excellent stability under thermal treatments.

By applying this dye onto polyester-cotton fabrics, according to Example 3, there was obtained a yellow tinged print without contrasts, having high light-fastness characteristics, resistance to moisture and rubbing, and stability to thermal treatments.

EXAMPLE 5

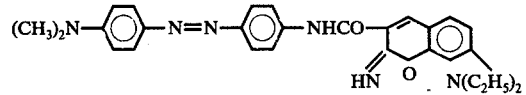

The aminoazo-p-(N-dimethylamino)-benzene, which is reacted with the ethyl cyanacetate, was obtained by diazotizing the p-nitroaniline, by coupling on N-dimethylaniline and finally by reduction of the $NO_2$ group.

Operating as indicated in Example 1, 4.8 g of aminoazo-p-(N-dimethylamino) benzene were reacted with 14.3 g of ethyl cyanacetate thus obtaining 2.4 g of cyanaceticanilide which in turn are condensed with 3.2 g of N-diethylsalicilic aldehyde, thereby obraining 2.5 g of a yellow azoiminocoumarinic dye which at the percentual analysis showed to be in good accord with the values calculated for $C_{28}H_{30}N_6O_2$ and to have a λ absorption in the visible spectrum at 450 mμ (acetone).

In the IR spectrum there was observed an intense band near to 6μ, typical for the C=O group, and the presence of the iminic NH group around 3μ.

When applying this dye on polyester, according to Example 2, one obtains a dyeing of a bright yellow tinge of high intensity, with a good light fastness, resistance to moisture, as well as an excellent stability under thermal treatments.

When applying the dye on a polyester-cotton fabric according to Example 3, there is obtained a printing in a yellow tone without contrasts, with high characteristics of light fastness, resistance to moisture and to rubbing and stability under thermal treatments.

In a way similar to that of the examples described above, there were prepared the dyes and obtained the dyeings and printings recorded in the following table:

TABLE

| | | Shades obtained on | |
|---|---|---|---|
| Ex. | DYE | polyester | polyester-cotton |
| 6 | 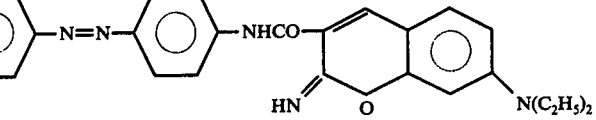 | Yellow | Yellow |
| 7 | 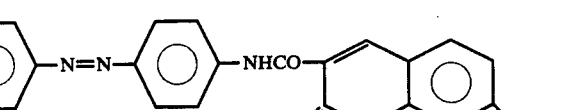 | Yellow | Yellow |
| 8 | 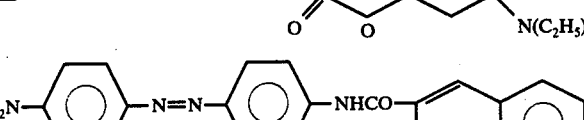 | Yellow | Yellow |
| 9 | 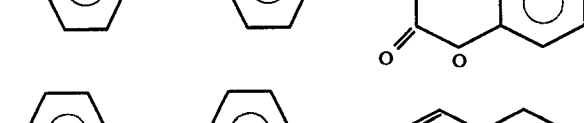 | Yellow | Yellow |
| 10 | 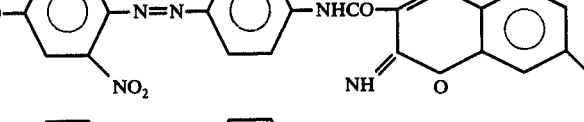 | gold yellow | gold yellow |
| 11 | 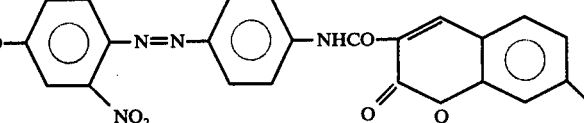 | orange | orange |
| 12 | 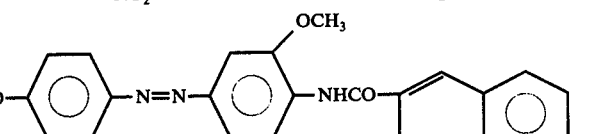 | orange | orange |

| | | Shades obtained on | |
|---|---|---|---|
| Ex. n° | DYE | Polyester | Polyester cotton |
| 13 |  | gold yellow | gold yellow |

TABLE-continued

14 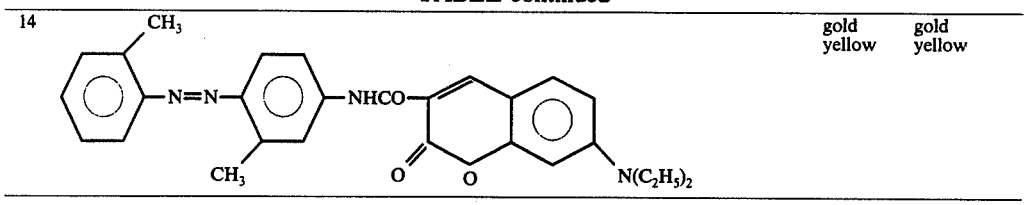

gold yellow | gold yellow

What is claimed is:

1. An azoic dye having the general formula:

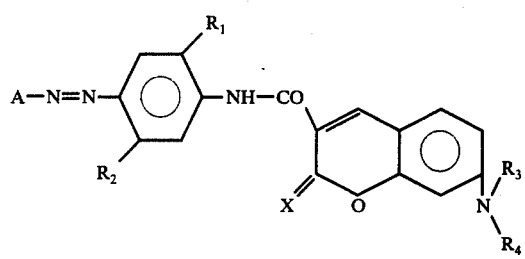

wherein: A is an aromatic radical of the benzene class which has been substituted with at least one group selected from among alkyl, alkoxyl, N-dialkylamine, halogen, cyano and nitro,
X is selected from the group consisting of NH and O;
$R_1$ is selected from the group consisting of H, $CH_3$, $OCH_3$ and Cl;
$R_2$ is selected from the group consisting of H, $CH_3$, $OCH_3$, and Cl;
$R_3$ is selected from the group consisting of $CH_3$ and $C_2H_5$;
$R_4$ is the same as $R_3$.

2. An azoic dye having the formula

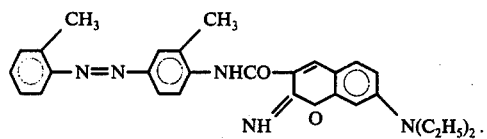

3. An azoic dye having the formula

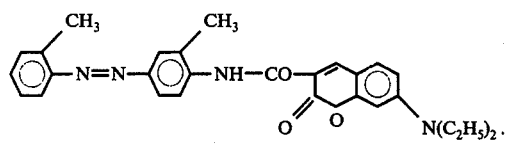

4. An azoic dye having the formula

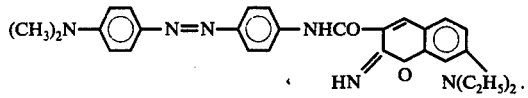

5. An azoic dye having the formula

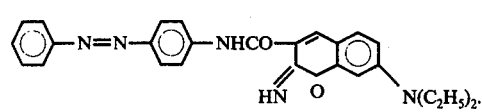

6. An azoic dye having the formula

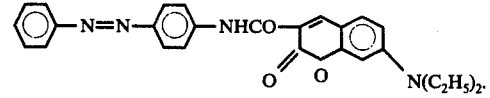

7. An azoic dye having the formula

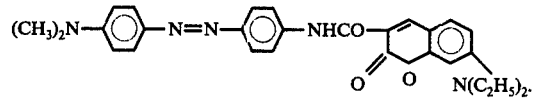

8. An azoic dye having the formula

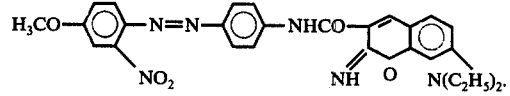

9. An azoic dye having the formula

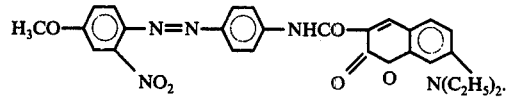

10. An azoic dye having the formula

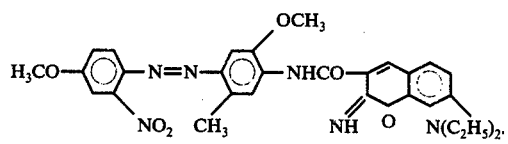

11. An azoic dye having the formula

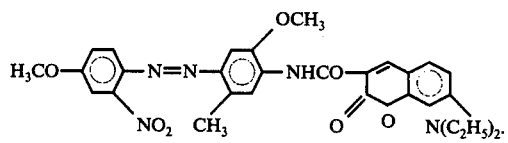

12. An azoic dye having the formula

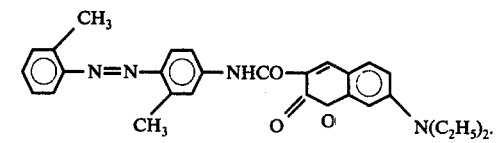

13. An azoic dye having the formula

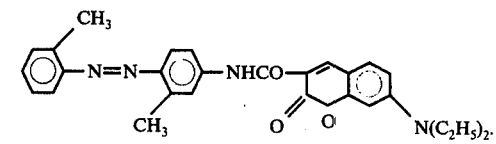

* * * * *

UNITED STATES PATENT OFFICE
CERTIFICATE OF CORRECTION

Patent No. 4,096,139    Dated   June 20, 1978

Inventor(s)   Ruggero Battistiano et al

It is certified that error appears in the above-identified patent and that said Letters Patent are hereby corrected as shown below:

In Col. 10, lines 55-60 (Claim 12), the structural formula should correctly read:

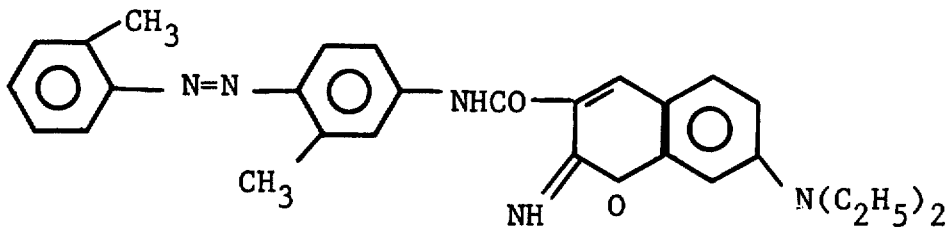

Signed and Sealed this

Thirteenth Day of March 1979

[SEAL]

Attest:

RUTH C. MASON
*Attesting Officer*

DONALD W. BANNER
*Commissioner of Patents and Trademarks*